(12) United States Patent
Frederiks

(10) Patent No.: US 11,286,112 B2
(45) Date of Patent: Mar. 29, 2022

(54) WAREHOUSE, IN PARTICULAR SHUTTLE WAREHOUSE

(71) Applicant: NEDCON B.V., Doetinchem (NL)

(72) Inventor: Jan Willem Frederiks, Doetinchem (NL)

(73) Assignee: NEDCON B.V., Doetinchem (NL)

( * ) Notice: Subject to any disclaimer, the term of this patent is extended or adjusted under 35 U.S.C. 154(b) by 128 days.

(21) Appl. No.: 16/785,711

(22) Filed: Feb. 10, 2020

(65) Prior Publication Data
US 2020/0270059 A1    Aug. 27, 2020

(30) Foreign Application Priority Data
Feb. 21, 2019  (DE) .................... 10 2019 104 372.7

(51) Int. Cl.
*B65G 1/04* (2006.01)
(52) U.S. Cl.
CPC ................. *B65G 1/0492* (2013.01)
(58) Field of Classification Search
CPC .................................................. B65G 1/0492
See application file for complete search history.

(56) References Cited

U.S. PATENT DOCUMENTS

| 6,149,366 A * | 11/2000 | Deandrea ............ B65G 1/0414 414/279 |
| 2018/0127207 A1* | 5/2018 | Neu ........................ B65G 1/02 |

FOREIGN PATENT DOCUMENTS

DE   10 2014 114 496    4/2016

\* cited by examiner

*Primary Examiner* — Saul Rodriguez
*Assistant Examiner* — Willie Berry, Jr.
(74) *Attorney, Agent, or Firm* — Gudrun E. Huckett

(57) ABSTRACT

A warehouse has a rack with an aisle and rails fastened to the rack extend along the aisle. The rails are made of rail segments that have a first profile section with a top side running surface. A distribution vehicle is movable along the aisle on the top side running surfaces and transports goods to be stored or retrieved from the rack. A pressure distribution bar is arranged where a first rail segment abuts a second rail segment. The pressure distribution bar has first and second length portions. The first length portion is supported against the first profile section of the first rail segment, the second length portion is supported against the first profile section of the second rail segment. A pressure transmission element has a first end supported from below against the pressure distribution bar and a second end supported against a counter bearing arranged at the rack.

9 Claims, 4 Drawing Sheets

INVENTION

WAREHOUSE, IN PARTICULAR SHUTTLE WAREHOUSE

BACKGROUND OF THE INVENTION

The invention relates to a warehouse, in particular a shuttle warehouse, comprising a rack, comprised of profile elements, for warehousing, and comprising at least one aisle for the transport of goods, which are to be stored and retrieved, by means of a distribution vehicle which is movable along the aisle on rails, wherein the rails are fastened to the rack and are respectively comprised of rail segments following one after another in the longitudinal direction of the rail, wherein the rail segments are respectively profiles comprising a profile section whose top side forms the running surface for the distribution vehicle.

Shuttle warehouses, as known, for example, from US 2018/0127207 A1, are parcelled goods stores in which the load units, for example, goods or pallets loaded with goods, are arranged one behind the other in individual channels, or they are stored on both sides of a transport aisle. For the storage, retrieval or, indeed, relocation of the goods, a distribution vehicle, often referred to as a "shuttle" or satellite vehicle, is used. This vehicle is configured to drive under the goods or load carriers, to then raise these, and, in the thus raised state, transport them to a different position of the warehouse. Distribution vehicles of this type possess, in particular, means for raising, fully automatically, the goods or the load carriers supporting the goods, to draw them out of the laterally arranged storage positions into the aisle, and then to move them within and along the aisle. Because of their considerable length, the rails on which the roller-mounted distribution vehicle rolls along the aisle are segmented, i.e. they are comprised of successive rail segments in the form of profiles. The profiles rest with their mutually adjacent ends jointly on a bracket and are bolted to the latter. With respect to this screw joint, US 2018/0127207 A1 proposes the use of self-clinching threaded bolts as connecting elements, since the top side of the self-clinching threaded bolts terminates flush with the actual running surface and, in this way, a smooth running of the distribution vehicle with low noise generation is intended to be obtained.

However, not only the connecting elements which are installed in the running surfaces contribute to the noise generation. The joints which are frequently present in the region where the rail segments adjoin also lead to noise generation and, moreover, to a vibration of the distribution vehicle, and of the load arranged thereon, as the vehicle drives across the rail joints. For, in practice, the dimensional stability of the rails and rail segments configured as profiles is subject to significant fluctuations.

In the warehouse according to DE 10 2014 114 496 A1, the rail segments, viewed in the longitudinal direction of the rail, have on the left and right alongside the rail joint, respectively, a first receptacle for respectively a bolt-shaped fastening means extending perpendicular to the rail. In addition, a fastening clamp is present. This has two U-shaped recesses for the respective reception of the fastening means. The U-shaped recesses are configured such that they are angled-off at the respectively outer branch.

The object of the invention is to reduce in a shuttle warehouse, by constructive measures, noises and vibrations in the region of successive rail segments, which noises and vibrations would otherwise be generated when the rail segments are driven over by the distribution vehicle ("shuttle").

SUMMARY OF THE INVENTION

In order to achieve this object, in a warehouse comprising the features specified in the introduction, it is proposed that a pressure distribution bar arranged in the region of two successive rail segments is supported with a part of its length against that profile section of the first rail segment that forms the running surface and with the remaining part of its length against that profile section of the second rail segment that forms the running surface, and that at least one pressure transmission element is supported, with one end, from below against the pressure distribution bar and, with the other end, against a counter bearing arranged rigidly with respect to the rack.

The pressure distribution bar is supported against the bottom sides of those profile sections of the two rail segments on which, at the top, the running surfaces are configured for the distribution vehicle to roll thereon. The running surfaces are free of openings for fastening screws.

The pressure distribution bar is subjected to an upwardly directed pressure. As a result of these measures, the profile sections forming the running surfaces for the distribution vehicle rolling thereon are brought into a mutual alignment, to be precise without fastening elements, such as, for example screws or their openings, having to be present in the running surfaces. Rather, the running surfaces run flatly and evenly, including in the jointed region of the successive rail segments, whereby the distribution vehicle rolling thereon displays a smooth and vibration-free running behaviour.

Although the evenness of the running surfaces is inevitably interrupted at the point where adjacent rail segments butt one against another, at these jointed regions no noteworthy height offset is found between the running surface of the first and the running surface of the second involved rail segment. Rather, a height offset of the profile sections comprising the running surfaces is prevented by the action of the pressure-loaded pressure distribution bar. This is so because the pressure distribution bar is supported with a part of its length against that side of the first rail segment that is facing away from the running surface and with the remaining part of its length against that side of the second involved rail segment that is facing away from the running surface. An upwardly directed, permanent compressive force acting on the pressure distribution bar, which is preferably flatly and evenly shaped on its top side, is of crucial importance.

This permanent compressive force is obtained in that at least one pressure transmission element, which preferably is itself rigidly configured, is supported, on the one hand, from below against the pressure distribution bar, and the same pressure transmission element is supported, on the other hand, against a counter bearing, wherein the counter bearing is arranged rigidly with respect to the rack of the warehouse. The rail segments too are fastened such that they are fixed to the rack, for example, by being screwed directly to vertical stays of the rack.

The location of the counter bearing is not critical as long as it is fixed to the rack. For example, the counter bearing can be located on a different profile section of the same rail segment.

Profiles made of metal plate which has been bent at least once serve as rails. Practice has shown that the production precision of these industrially produced rails is subject to fluctuations. Although the metal plates which are used are of good dimensional stability as regards their material thickness, i.e. plate thickness, the profiles shaped by bending of the metal plates display a variance of their profile cross-sections. The invention is therefore founded on the recognition that inaccuracies present in the jointed region between successive rail segments are more likely attributable to deficient dimensional stability of the profile cross-sections than to fluctuations in the material thickness of the metal plate of which the rail segments consist.

With the here-described measures, joint-free transitions between the running surfaces of successive rail segments of the rail are therefore achieved.

One embodiment proposes that the pressure transmission element is configured such that it is adjustable in terms of its length and/or its position in a direction perpendicular to the running surface. Preferably, the pressure transmission element is a screw or a stud bolt.

According to one embodiment, the counter bearing against which the pressure transmission element is capable of resting is located on a bracket. The bracket is connected to the rail segment at least in a direction perpendicular to the running surface.

In addition, one embodiment provides that the rail segments have a further profile section which leads downwards from the profile section forming the running surface and to which the bracket is connected.

When two brackets are used in the region of the connection of the two rail segments, then the first bracket is connected only to the first rail segment, and the second bracket only to the second rail segment.

Preferred is however a structural form in which, in the region of the connection of the two rail segments, only a single bracket is used, wherein this bracket is connected both to the first rail segment and to the second rail segment.

According to a preferred embodiment, each rail segment comprises a fastening portion and the fastening portion is fastened directly against a mounting surface of the rack, to which mounting surface the bracket is fastened only indirectly, with the interposition of the fastening portion.

A further embodiment is characterized by, in total, two pressure transmission elements, which, on the one hand, are both supported against the pressure distribution bar and which, on the other hand, are supported against separate counter bearings, of which the first counter bearing is arranged on the length of the first rail segment, and the second counter bearing on the length of the second rail segment.

BRIEF DESCRIPTION OF THE DRAWINGS

Illustrative embodiments are explained in greater detail below with reference to the associated Figures.

DESCRIPTION OF PREFERRED EMBODIMENTS

Figure 1:
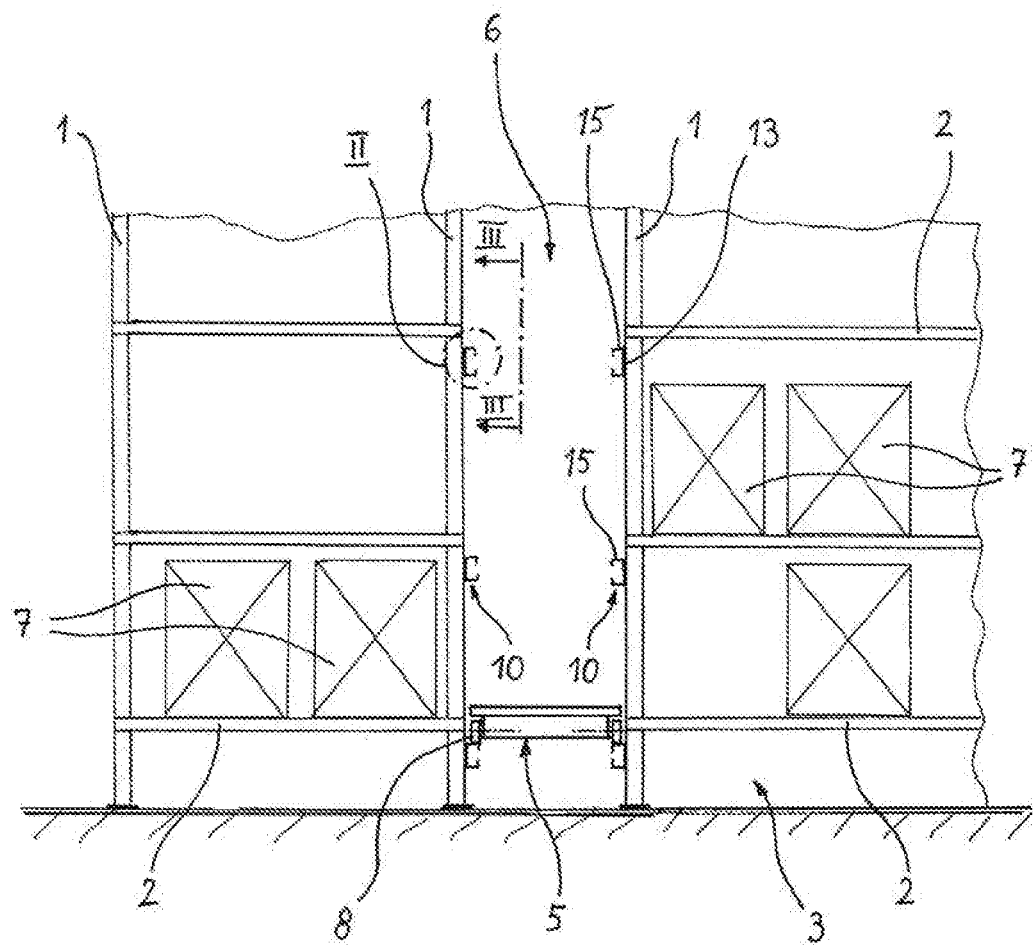
FIG. 1 shows a warehouse, and in particular a shuttle warehouse, comprising a rack comprised of profile elements, inclusive of an aisle for the transport of the goods which are to be stored and retrieved, wherein in the aisle a distribution vehicle which is movable along the aisle and is supported on rollers is provided.

FIG. 1 shows in an overview a warehouse, configured as a rack 3, in the configuration as a so-called shuttle warehouse. As a "shuttle", a distribution vehicle 5 is provided which is supported on rollers and is provided with a lifting platform and which is movable along an aisle 6 of the warehouse and can hereupon adopt different positions before the individual storage places. FIG. 1 shows, in this connection, storage places on both sides of the aisle 6, wherein, at individual ones of the storage places, goods 7 are found. These goods 7 can also be goods packages and containers, which respectively rest on a transport means, such as, for example, a pallet.

The rack 3 of the warehouse is comprised of a multiplicity of profile elements 1, 2. These profile elements include vertical supports 1, which form the static basic structure of the warehouse, and horizontal stays or crossbars 2, which are fastened to the vertical stays 1. The profile elements of the rack 3 further include goods support surfaces for the stored goods 7. Furthermore, for the strengthening of the rack 3, transversely running or diagonal profile elements can also be present.

The storage and retrieval of the individual goods 7 is realized via the aisle 6, in which the distribution vehicle 5 is longitudinally movable. FIG. 1 shows in this respect only one distribution vehicle 5 at one level, yet corresponding distribution vehicles can also be found at the other levels. It is likewise possible that, by means of a lifting mechanism (not represented), one and the same distribution vehicle 5 is moved to different levels so that this vehicle can then also navigate the other levels of the rack 3 and store and retrieve goods there.

The distribution vehicle 5 rolls on rollers 8, which, at least in part, are driven rollers. Usually such distribution vehicles 5 possess four rollers 8, of which two are arranged on the left side and two on the right side of the vehicle.

For the support and lateral guidance of the rollers 8, rails 10 present in pairs are arranged in the aisle 6. The first rail 10 is located on the first side of the aisle and the second rail 10 on the other side of the aisle. The rails 10 are fastened to the rack 3 of the warehouse. Preferably, the fastening of the rails 10 to the vertical stays 1, which are statically particularly suitable for this, is realized, for example, by means of screws.

Serving as rails 10 are profiles, which are comprised partially of horizontal and partially of vertical profile sections. The profiles can be closed profiles or hollow profiles, or open profiles, such as, for example, L-shaped or S-shaped profiles. In the first illustrative embodiment, the rails 10 are configured as profiles of C-shaped cross-section, wherein a vertical profile section 13 of the rail 10 is fastened to the stays 1, whereas the open profile side faces towards the aisle 6. A horizontal profile section 16 of the rail 10 forms with its flat top side the running surface 15 for the rollers 8 of the shuttle.

Each rail 10 is of considerable length overall, for which reason it is sensible, from an assembly-related viewpoint, to segment the rail 10, i.e. divide it into individual, successive rail segments.

Figure 3:
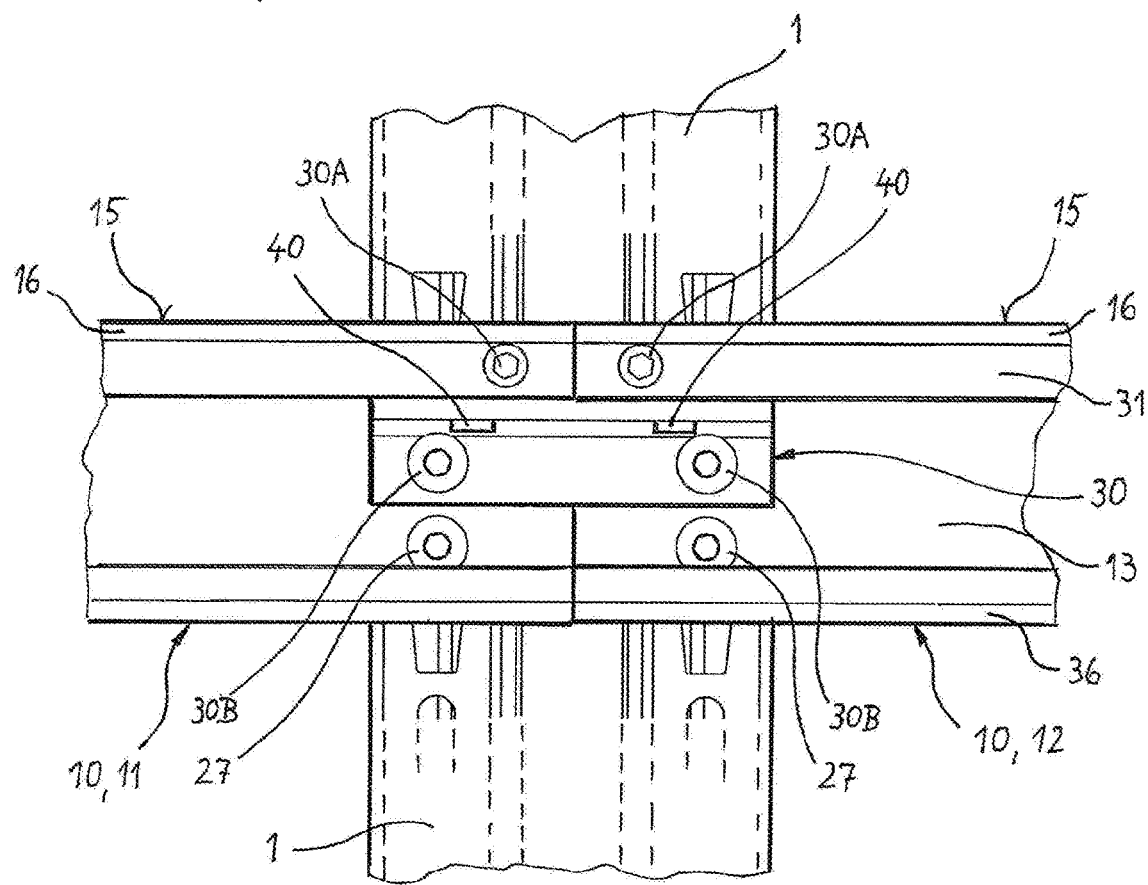
FIG. 3 shows a view of the rail and of the stay, in accordance with the direction of view III-III marked in FIG. 1.

In this connection, FIG. 3 shows one of the two rails 10 in the region of its screw joint to a vertical stay 1 of the rack. It can be seen, in particular, that in this screw joint region a first rail segment 11 and a second rail segment 12 butt one against the other. The mutual abutment should be such that the running surface 15 which is formed by the upper profile sections 16 of the rail segments 11, 12 is made as continuous as possible, i.e. without a step and without a noteworthy height offset of the running surface 15 on the rail segment 11 relative to the running surface 15 on the rail segment 12.

In practice, the precision of the profiles forming the rail segments 11, 12 is subject to fluctuations. Although the metal plates used for the manufacture of the rail segments are of good dimensional stability as regards their plate thickness, the rail segments produced by bending of the metal plates display a certain variance in their profile cross-sections.

Figure 6A:
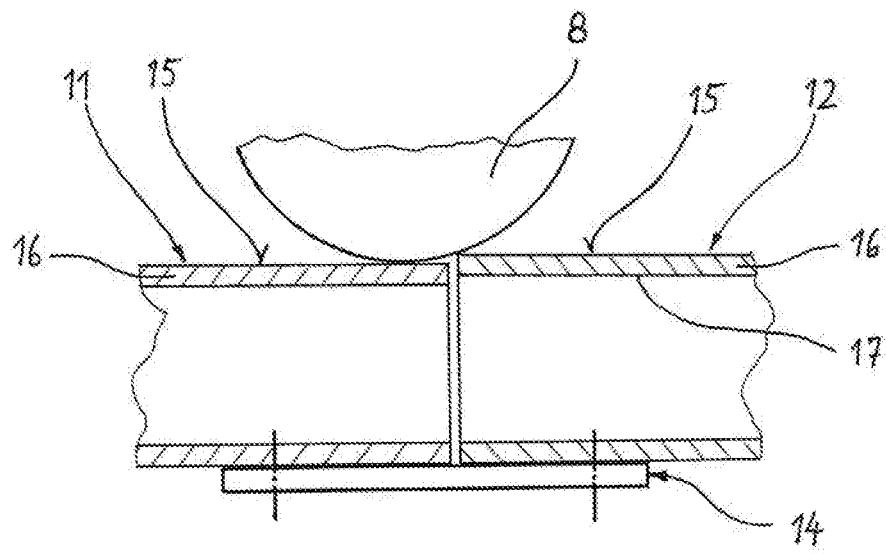
FIG. 6a shows a basic representation illustrating the problem underlying the invention.

FIG. 6a illustrates this. The overall height of the rail segment 11 represented on the left in FIG. 6a is, for production-related reasons, somewhat less than the overall height of the other rail segment 12. As a result, at least when both rail segments 11, 12 are fastened with their bottom side on a common, rack-fixed bracket 14, a slight step then comes about in the jointed region. When the running surfaces 15 exhibiting a height offset are driven over, vibrations of the distribution vehicle, here represented by its roller 8, ensue.

Figure 6B:
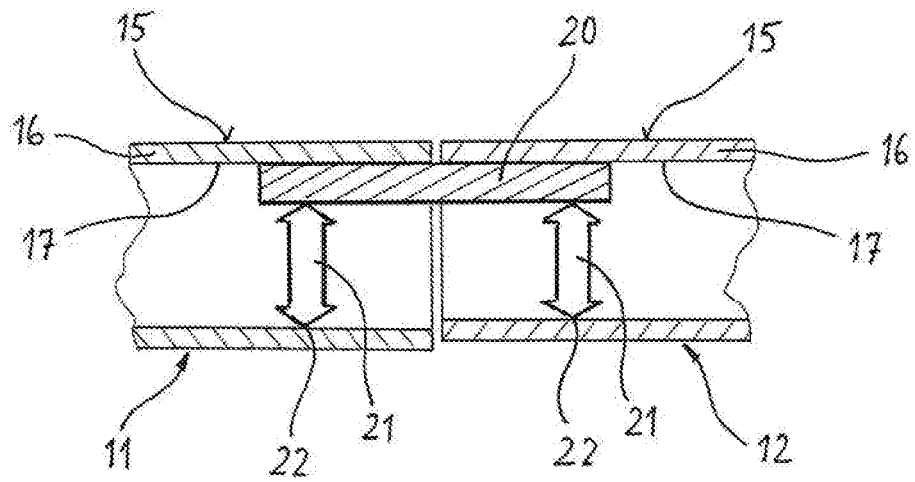
FIG. 6b shows a basic representation of the technical solution proposed herein.

The situation is different in the case of the measures represented schematically in FIG. 6b. Although the adjacent rail segments 11, 12 are screwed onto the rack of the warehouse, they are not supported with their overall height on a bracket 14 fixed to the rack. Instead, an alignment of the rail segments 11, 12 one to another is realized by means of a pressure distribution bar 20. The pressure distribution bar 20 is supported with its straight, flat top side against the bottom side of each profile section 16 of the rail segments 11, 12, which profile section forms on its top side the running surface 15.

The arrangement is such that the pressure distribution bar 20 is supported with a part of its length against the rear side 17, facing away from the running surface 15, on the first rail segment 11, and with the remaining part of its length against the rear side 17, facing away from the running surface 15, on the second rail segment 12. Between the pressure distribution bar 20 and the running surface 15, only the plate thickness of the profile section 16 is provided. The dimensional stability of the plate thickness is however good since it has been shown that the metal plates used for the manufacture of the rail segments 11, 12 are almost always of good dimensional stability as regards their pure material thickness, i.e. their plate thickness.

The pressure distribution bar 20 therefore forms with its straight, flat top side a "smoothing" compensation element, which, under the exertion of pressure from below, is supported against that profile section 16 which forms on its top side the running surface 15. A precondition for the effectiveness of the pressure distribution bar 20 is that its top side is substantially flat and of a width which is maximally equal to the width of the running surface 15, and that it is subject to an upwardly directed pressure load. This pressure load is achieved by pressure transmission elements 21, which in FIG. 6b are represented merely schematically by way of vertical pressure arrows. Concrete Illustrative embodiments of the pressure transmission elements 21 are represented below with reference to FIGS. 2 to 5.

It is not absolutely necessary that, as represented in FIG. 6b, two separate pressure transmission elements 21 are present. Just a single pressure transmission element 21, when it is supported against a counter bearing arranged rigidly with respect to the rack 3, is also capable of providing the necessary compressive force, which presses the pressure distribution bar 20 permanently from below against the horizontal profile sections 16 of the rail segments 11, 12.

Figure 2:
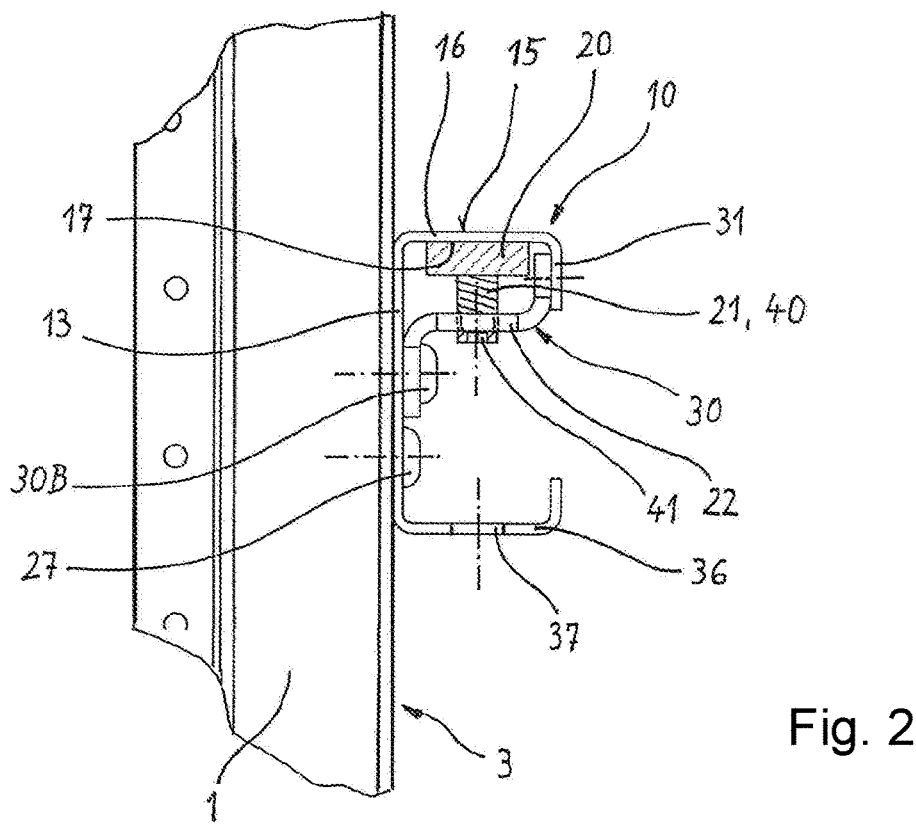
FIG. 2 shows the detail II labelled in FIG. 1, namely the region of attachment of a rail, forming the running surface for the distribution vehicle, to a stay of the rack.

In FIGS. 2 and 3, a first embodiment is represented. The two rail segments 11, 12 are of C-shaped profile cross-section, as represented also in FIG. 1. By means of screws 27, the two rail segments 11, 12 are screwed directly to the vertical stay 1 of the rack 3.

In the connecting region of the rail segments 11, 12, a bracket 30 is inserted into the rail segments 11, 12. The bracket 30 is, for example, of S-shaped profile cross-section. In the longitudinal direction of the rail, it is of such length that it is located with one part of its length in the rail segment 11, and with the remaining part of its length in the rail segment 12.

The bracket 30 is a short profile, which is fixedly connected to both rail segments 11, 12. The bracket 30 is connected to profile sections 31, which project downwards from the profile sections 16 forming the top side running surface 15, by a first screw joint 30A. Moreover, the bracket 30 is connected to the vertical profile sections 13, which are fastened to the rack 3, by a second screw joint 30B. The screw joints 30A, 30B are realized by means of screws, which pass through openings in the bracket 30, in the profile sections 31 and 13 of the rail segments and, moreover, through openings in the stay 1.

The bracket 30 seated in both rail segments 11, 12 forms with the rail segments 11, 12 a fixed, though not necessarily completely rigid sub-assembly. In this sub-assembly, the bracket 30 forms the necessary counter bearing 22 when the pressure distribution bar 20 is pressed against the profile section 16.

Each one of the rail segments 11, 12 is provided with a screw 40, respectively, that serves as the adjustable pressure transmission element 21. Its thread is screwed to a corresponding internal thread on the bracket 30. For the exertion of pressure, the end face of each screw 40 is supported against the pressure distribution bar 20, which, in the illustrative embodiment, has a bottom side which extends parallel to the top side. The pressure distribution bar 20 is here shaped as an elongate cuboid.

The internal thread on the bracket 30 serves as the counter bearing 22. For the turning of the screw 40 and hence adjustment of the pressure on the pressure distribution bar 20, the screw 40 is provided at its other, lower end with flats 41 for the application of a suitable tool, for example, an Allen key. A lower profile section 36 of the segments 11, 12 is provided, in extension of the screw 40, with an opening 37 for passing-through the tool.

The bracket 30 can be of the same length as the pressure distribution bar 20, or of greater or lesser length. However, both the bracket 30 and the pressure distribution bar 20 are shorter than the rail segments 11, 12, since they extend only over the end regions of the rail segments 11, 12.

In the embodiment according to FIG. 2 and FIG. 3, the bracket 30 extends partially in one and partially in the other rail segment. Alternatively, it is also possible to use two brackets that are only half as long, wherein the first bracket is arranged and fastened only in the first rail segment 11, and the second bracket only in the second rail segment 12. In this case, too, it is however essential that only one pressure distribution bar 20 is present since the height compensation is obtainable only in this way.

Figure 4:
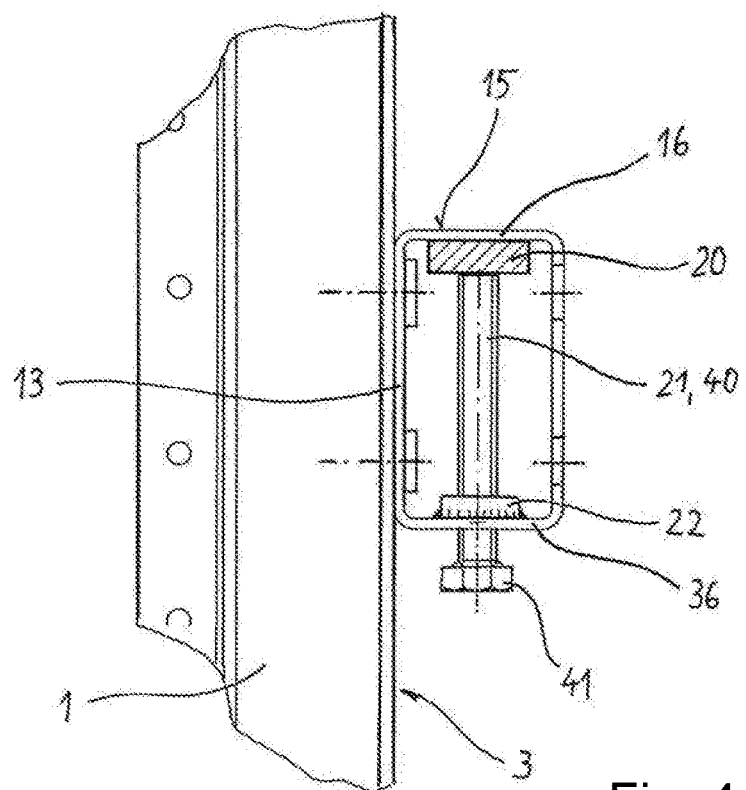
FIG. 4 shows a second embodiment, wherein the representation is analogous to that of FIG. 2.

In FIG. 4, a second, markedly simplified embodiment is represented. The rail segments 11, 12 are here closed rectangular hollow profiles, which are respectively bolted to the rack 3. The pressure transmission elements 21 supported against the common pressure distribution bar 20 are, in turn, screws 40. The rack-fixed counter bearing 22 is however not located on an additional bracket, but on the lower profile section 36 of the rectangular profile. For an enhanced load-bearing capacity, a nut is welded to the inside of the profile section 36 and is provided with the internal thread for adjustment of the screw 40.

As in the first embodiment, the screws 40 press with their other end from below against the common pressure distribution bar 20, which, in turn, is supported against the rear side 17 of those profile sections 16 which, at the top, form the top side running surfaces 15.

Figure 5:
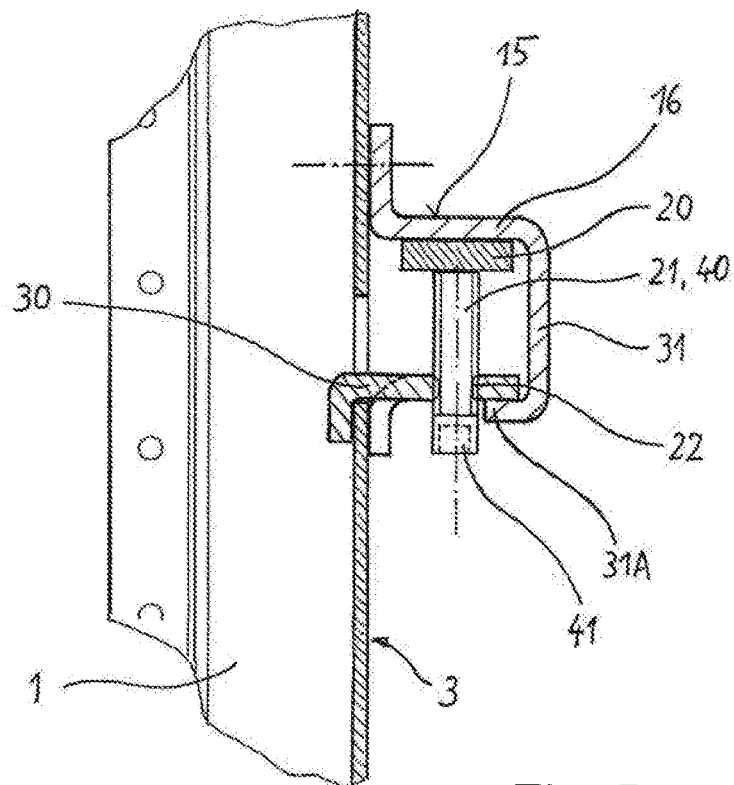
FIG. 5 shows a third embodiment, wherein the representation is analogous to that of FIG. 2.

In FIG. 5, a third embodiment is represented. It is characterized by good ease of assembly and by the fact that the structural height of the rail segments, inclusive of the bracket 30 serving as the counter bearing, is relatively small. The rail segments 11, 12 are here of downwardly open cross-section. A short horizontal profile section 31A of the segments forms a support surface on which the bracket 30 is supported with one longitudinal edge, whilst the bracket 30 is hooked with the other longitudinal edge in the vertical stay 1. The bracket 30 is therefore mounted without screw joints.

For the hanging of the bracket 30 provided with hooks, the stay 1 is provided with corresponding openings. In turn, the bracket 30 is provided with an internal thread, which forms the actual counter bearing 22 and in which the screw 40 serving as the pressure transmission element 21 engages with its external thread.

The bracket 30 extends selectively over the end regions of both rail segments 11, 12, or there are two separate brackets 30 present, wherein the first bracket is arranged only in the rail segment 11 and the other bracket only in the other rail segment 12. In turn, however, the pressure distribution bar 20 is continuous, as represented in FIG. 6b.

The specification incorporates by reference the entire disclosure of German priority document 10 2019 104 372.7 having a filing date of 21 Feb. 2019.

While specific embodiments of the invention have been shown and described in detail to illustrate the inventive principles, it will be understood that the invention may be embodied otherwise without departing from such principles.

LIST OF REFERENCE CHARACTERS 1 stay
2 horizontal support, crossbar
3 rack
5 distribution vehicle, shuttle
6 aisle
7 goods item
8 roller
10 rail
11 rail segment
12 rail segment
13 vertical profile section, fastening portion
14 bracket
15 running surface
16 first profile section
17 rear side (bottom side)
20 pressure distribution bar
21 pressure transmission element
22 counter bearing
27 screws
30 bracket
30A screw joint
30B screw joint
31 second profile section
31A horizontal profile section
36 lower profile section
37 opening
40 screw
41 flat

What is claimed is:

1. A warehouse comprising:
a rack (3), comprised of profile elements (1, 2), configured to store goods (7) and comprising at least one aisle (6);
rails (10) fastened to the rack (3) and extending along the at least one aisle (6), wherein the rails (10) are comprised of rail segments (11, 12) following each other in a longitudinal direction of the rails (10), wherein the rail segments (11, 12) are profiles each comprising a first profile section (16) with a top side running surface (15);
a distribution vehicle (5) movable along the at least one aisle (6) on the top side running surfaces (15) of the first profile sections (16) of the rail segments (11, 12) of the rails (10), wherein the distribution vehicle (5) is configured to transport goods (7) to be stored In the rack (3) and to be retrieved from the rack (3);
a pressure distribution bar (20) arranged in a region where a first rail segment and a second rail segment of the rail segments (11, 12) abut, wherein the pressure distribution bar (20) is comprised of a first length portion and a second length portion, wherein the first length portion is supported from below against the first profile section (16) of the first rail segment (11), and the second length portion is supported from below against the first profile section (16) of the second rail segment (12);
a counter bearing (22) positioned below the pressure distribution bar (20) and rigidly connected to the rack (3);
a pressure transmission element (21) comprising a first end supported from below against the pressure distribution bar (20) and a second end, opposite the first end, supported against the counter bearing (22).

2. The warehouse according to claim 1, wherein a length and/or a position of the pressure transmission element (21) is configured to be adjustable in a direction perpendicular to the running surfaces (15).

3. The warehouse according to claim 2, wherein the pressure transmission element (21) is a screw or a stud bolt.

4. The warehouse according to claim 1, further comprising a bracket (30) connected to the first and/or to the second rail segment (11, 12) at least in a direction perpendicular to the running surfaces (15), wherein the counter bearing (22) is provided on the bracket (30).

5. The warehouse according to claim 4, wherein the rail segments (11, 12) comprise a second profile section (31) extending downward from the first profile section (16), wherein the bracket (30) is connected to the second profile section (31).

6. The warehouse according to claim 4, wherein two of said bracket (30) are provided and wherein a first one of said two brackets (30) is connected only to the first rail segment (11) and a second one of said two brackets (30) is connected only to the second rail segment (12).

7. The warehouse according to claim 4, wherein the bracket (30) is connected to the first rail segment (11) and to the second rail segment (12).

8. The warehouse according to claim 7, wherein the rail segments (11, 12) each comprise a fastening portion (13) fastened directly against a mounting surface of the rack (3), wherein the bracket (30) is fastened only indirectly, with the fastening portion (13) interposed, to the mounting surface.

9. The warehouse according to claim 1, wherein two of said counter bearing (22) are provided, wherein the first of the two counter bearings (22) is arranged on the first rail segment (11) and the second of the two counter bearings (22) is arranged on the second rail segment (12), wherein two of said pressure transmission element (21) are provided, wherein the second end of the first of the two pressure transmission elements (21) is supported against said first counter bearing (22), and the second end of the second of the two pressure transmission elements (21) is supported against said second counter bearing (22).

* * * * *